(12) United States Patent
Tanno

(10) Patent No.: US 8,439,091 B2
(45) Date of Patent: May 14, 2013

(54) PNEUMATIC TIRE

(75) Inventor: Atsushi Tanno, Hiratsuka (JP)

(73) Assignee: The Yokohama Rubber Co., Ltd (JP)

(*) Notice: Subject to any disclaimer, the term of this patent is extended or adjusted under 35 U.S.C. 154(b) by 393 days.

(21) Appl. No.: 12/782,883

(22) Filed: May 19, 2010

(65) Prior Publication Data

US 2010/0294406 A1    Nov. 25, 2010

(30) Foreign Application Priority Data

May 25, 2009   (JP) .................... 2009-125677

(51) Int. Cl.
    *B60C 5/00*    (2006.01)
    *B60C 19/00*    (2006.01)
    *B60C 3/06*    (2006.01)

(52) U.S. Cl.
    USPC ........... 152/157; 152/450; 152/456; 301/6.91

(58) Field of Classification Search .................. 152/155, 152/157, 158, 209.1, 375, 378 R, 381.3, 450, 152/455, 456; 301/6.91; B60C 5/00, 5/12, B60C 5/14, 19/00
See application file for complete search history.

(56) References Cited

U.S. PATENT DOCUMENTS

| | | | | |
|---|---|---|---|---|
| 5,201,969 | A * | 4/1993 | Nishi et al. ..................... | 152/527 |
| 2006/0231185 | A1* | 10/2006 | Tanno ........................... | 152/450 |
| 2007/0074798 | A1* | 4/2007 | Tanno et al. .................. | 152/450 |
| 2007/0119533 | A1* | 5/2007 | Yukawa ......................... | 152/450 |
| 2008/0163967 | A1* | 7/2008 | Heuze et al. .................. | 152/520 |

FOREIGN PATENT DOCUMENTS

| | | |
|---|---|---|
| JP | 2003-285607 | 10/2003 |
| WO | WO2005/012005 | 8/2004 |

* cited by examiner

*Primary Examiner* — Justin Fischer
*Assistant Examiner* — Philip N Schwartz
(74) *Attorney, Agent, or Firm* — Thorpe North & Western LLP

(57) ABSTRACT

A pneumatic tire including: a tread portion and a belt layer on an outer periphery of a carcass layer that extends between left and right bead portions and a plurality of circumferential main grooves extending in a tire circumferential direction provided on an outer surface of the tread portion, wherein on a tire cavity side surface of the tread portion, a ridge (Ra) protruding into the tire cavity side in a direction opposite to a tire radial direction is formed that extends in the tire circumferential direction in a position offset from a tire center towards a well side of a mounting rim so as to encompass an entire width of a well and an entire width of a circumferential main groove positioned farthest to a shoulder side.

16 Claims, 4 Drawing Sheets

PNEUMATIC TIRE

PRIORITY CLAIM

This application is based upon and claims the benefit of priority from Japanese Patent Application No. 2009-125677, filed May 25, 2009, the entire contents of which are incorporated herein by reference.

TECHNICAL FIELD

The present invention relates to a pneumatic tire, and more specifically relates to a pneumatic tire with reduced cavity resonance and road noise in a middle frequency range (315 Hz band).

BACKGROUND

Although noise generated by pneumatic tires has various causes, among these, cavity resonance near 200 to 250 Hz generated by vibration of the air filling the tires and road noise in the middle frequency range (315 Hz band in ⅓ octave band) generated by a transfer of tire vibration caused by uneven road surfaces are transmitted into a vehicle cabin, causing passengers discomfort.

Of these, the cavity resonance in the low frequency range is air column resonance caused when air vibrations travel through the cavity of circular tires, which form air columns As ways to reduce this cavity resonance, many methods have been suggested wherein noise is absorbed by a noise-absorbing member including a porous material such as urethane foam or the like provided within the cavity between the tire and the rim of the wheel.

However, as the technical concept behind these suggested technologies involves the absorption of noise generated in the tire cavity by means of the noise-absorbing members, effects cannot be achieved unless the provided noise-absorbing members are of at least a certain volume. This can cause problems during the rim-mounting process as the noise-absorbing members occupy a considerable amount of space within the tires. Also, there is a problem of a deterioration of the noise-absorbing members over long-term use leading to reduced noise absorption performance, thus failing to achieve the desired noise prevention effect.

Furthermore, as the noise-absorbing members formed from porous material are intended exclusively to reduce cavity resonance, which is caused by the vibration of air, it has almost no effect on the reduction of road noise in the middle frequency range caused by the vibration of the tire. Accordingly, such members do not produce the effect of reducing noise generated inside cars in bands other than that of cavity resonance.

SUMMARY

In light of the above points, an object of the present invention is to provide a pneumatic tire capable of reducing noise from cavity resonance of near 200 to 250 Hz to road noise in the middle frequency range (315 Hz band) through the provision of a simple construction.

The pneumatic tire of the present invention achieving the above object is constructed according to (1) below.

(1) A pneumatic tire including: a tread portion and a belt layer on an outer periphery of a carcass layer that extends between left and right bead portions and a plurality of circumferential main grooves extending in a tire circumferential direction provided on an outer surface of the tread portion, wherein
on a tire cavity side surface of the tread portion, a ridge (Ra) protruding into the tire cavity side in a direction opposite to a tire radial direction is formed that extends in the tire circumferential direction in a position offset from a tire center towards a well side of a mounting rim so as to encompass an entire width of a well and an entire width of a circumferential main groove positioned farthest to a shoulder side.

Also, the pneumatic tire of the present invention preferably has any of the specific constructions according to (2) to (9) below.

(2) The pneumatic tire according to (1), wherein a thickness of the ridge (Ra) from an innermost layer of the carcass layer is from 1.0 to 10 mm greater than in other regions of the tire cavity side surface.

(3) The pneumatic tire according to (1) or (2), wherein an edge of the ridge (Ra) on the shoulder side in a tire width direction is positioned more towards the tire center than a point where a perpendicular line extending from an edge of a widest part of the belt layer intersects the carcass layer, and an edge of the ridge (Ra) on the tire center side extends to the tire center if there is no circumferential main groove provided on the tire center, and to a point on a side of the circumferential main groove on the tire center opposite to the well that is 15 mm removed from an edge of the circumferential main groove on the side opposite to the well if there is a circumferential main groove provided on the tire center.

(4) The pneumatic tire according to any one of (1) to (3), wherein another ridge (Rb) is formed on the side of the tire center opposite to the well extending in the tire circumferential direction and protruding into the tire cavity side in the direction opposite to the tire radial direction so as to encompass an entire width of a circumferential main groove positioned farthest to a shoulder side on the side of the tire center opposite to the well.

(5) The pneumatic tire according to (4), wherein a thickness of the ridge (Rb) from the innermost layer of the carcass layer is from 1.0 to 10 mm greater than other regions of the tire cavity side surface.

(6) The pneumatic tire according to any one of (1) to (5), wherein tire masses on left and right sides when a tire main body is bisected at the tire center are equal.

(7) The pneumatic tire according to any one of (1) to (6), wherein the ridges (Ra) and (Rb) are formed by disposing an elastomer between an inner liner layer and the innermost layer of the carcass layer.

(8) The pneumatic tire according to (7), wherein a tan δ of the elastomer is 0.15 or less.

(9) The pneumatic tire according to (7) or (8), wherein a hardness of the elastomer is from 70 to 95.

According to the present invention, a ridge (Ra) is formed on the tire cavity side surface of the tread portion protruding into the tire cavity side in a direction opposite to the tire radial direction. This ridge extends in the tire circumferential direction in a position offset from the tire center to the well side of the mounting rim so as to encompass an entire width of a well and an entire width of a circumferential main groove positioned farthest to a shoulder side. Thus, when the tire inner cavity is assumed to be a circular air column, the presence of the ridge increases the difference in the average circumferential length in the tire circumferential direction between the circular air column in the region including the well width and the air column in other regions. This in turn increases the difference in the wavelengths of the resonance generated by the different air columns, lowering the peak of the resonance and enabling a reduction in noise.

Also, as the ridge (Ra) is formed in the direction opposite to the radial direction so as to encompass the entirety of the width of the circumferential main groove that is positioned farthest to the shoulder side, the rigidity of the shoulder region of the tread portion is increased, thus increasing the specific frequency of the specific mode in which the shoulder is deformed and reducing road noise in the middle frequency range.

DETAILED DESCRIPTION

Figure 1:
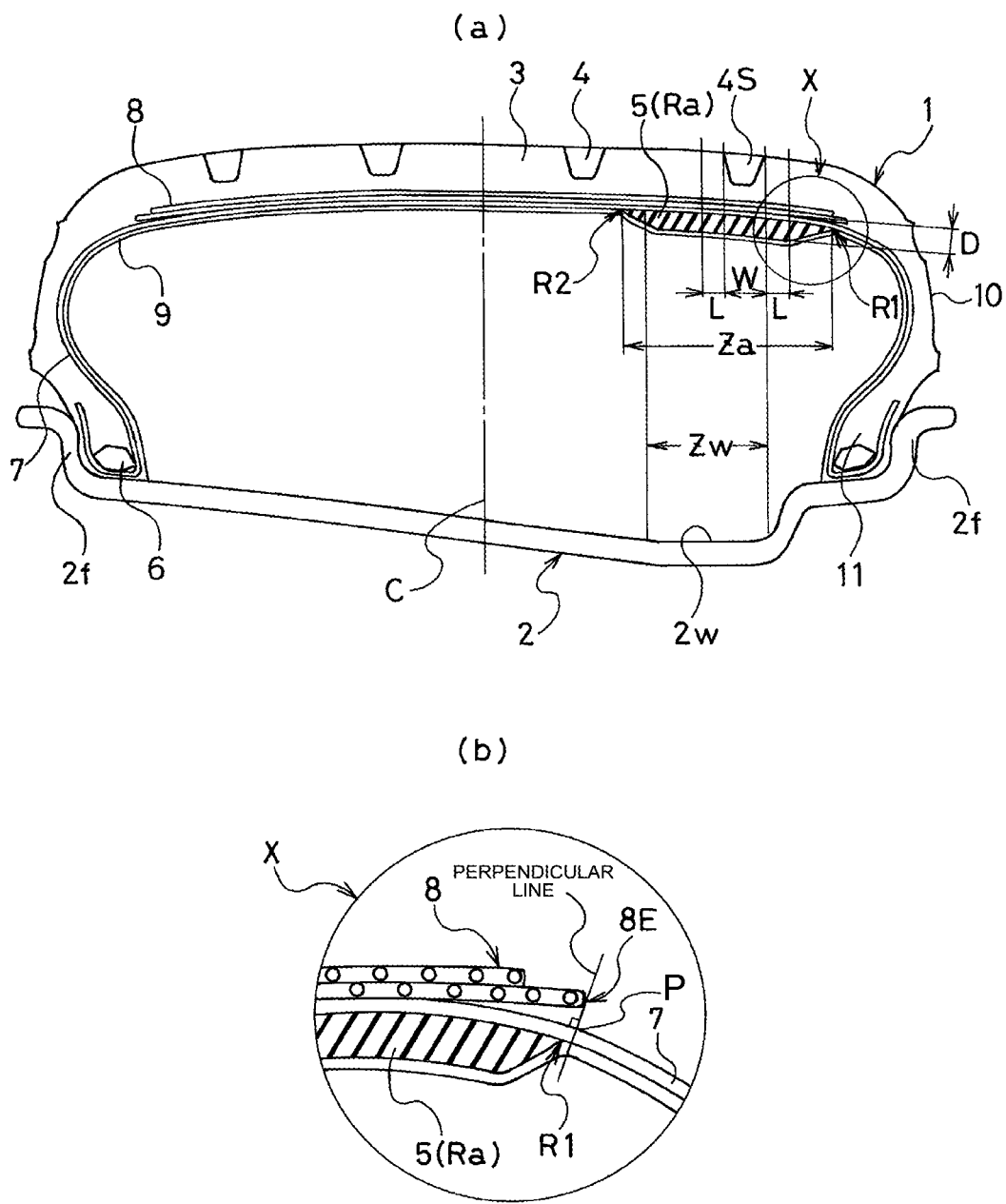
FIG. 1A is a meridian cross-sectional view of a tire and wheel assembly in which a pneumatic tire according to an embodiment of the present invention is mounted on a rim.
FIG. 1B is an enlarged view of the X portion in FIG. 1A.

A detailed explanation of the pneumatic tire of the present invention will be given below with reference to the examples shown in the drawings.

In FIG. 1, 1 is a pneumatic tire of the present invention and 2 is a rim having the pneumatic tire 1 mounted thereon. The rim 2 is a structural part forming a periphery part of a wheel. A rim flange $2f$ is formed on both edges of the rim 2 in an axial direction. A well $2w$ that is concave in a radial direction is formed in a position offset from a rim width center towards an outer side of a vehicle when the tire is mounted on the vehicle. The well $2w$ is provided as a place in which to temporarily fit one bead portion 11 when the tire is mounted on the rim 2.

The pneumatic tire 1 of the present invention has a side section 10 and a bead portion 11 on left and right sides of a tread portion 3, and is provided on an inner side with a carcass layer 7 having at least one layer that spans between the left and right bead portions 11. The carcass layer 7 extends from the tread portion 3 to the left and right side sections 10 and bead portions 11, and both ends thereof are folded back from the inner side to the outer side of the tire around a bead core 6. A belt layer 8 having at least two layers is provided around a periphery of the carcass layer 7. Also, an inner liner layer 9 is provided as an air proofing layer on an inner side of the innermost layer of the carcass layer 7.

A plurality of circumferential main grooves 4 extending in a tire circumferential direction is provided on the left and right sides centered around a tire center C on an outer surface of the tread portion 3. In the present invention, the term "circumferential main grooves" includes grooves that are continuous in the tire circumferential direction and that have the largest groove depth in the tire, and also grooves having a groove depth of 50% or more of the largest groove depth. The number of circumferential main grooves 4 is preferably three or four. However, there are no particular limitations to the number of grooves as long as there is a plurality thereof. Also, the circumferential main grooves 4 may be on the tire center C and/or at a position separated from the tire center C.

In the pneumatic tire 1, on a surface of a tire inner cavity side corresponding to the tread portion 3, in a position offset from the tire center C on the well $2w$ side of the rim 2 on which the tire is mounted, a ridge 5 (Ra) is formed extending in the tire circumferential direction, having a width Za, protruding into the tire inner cavity side in a direction opposite to the a radial direction so as to encompass an entire width Zw of the well $2w$ and so as to encompass an entire width of a circumferential main groove 4 that is positioned most to a shoulder side.

The width Za of the ridge 5 (Ra) that corresponds to a circumferential main groove 4S, as shown in FIG. 1a, not only encompasses an entire width W of the circumferential main groove 4S, but further preferably extends a distance L to points at least 10 mm from both edges of the circumferential main groove 4S towards both sides of the tire width direction.

By the ridge 5 (Ra) thus being formed so as to encompass the entire width Zw of the well $2w$ in a direction opposite to the tire radial direction and extend in the tire circumferential direction, when the tire inner cavity is assumed to be a circular air column, the presence of the ridge 5 (Ra) increases a difference in average circumferential length in the tire circumferential direction between the circular air column in the region encompassing the well width and the air column in other regions. This in turn increases a difference in the wavelengths of the resonance generated by the different air columns, lowering the peak of the resonance and enabling a reduction in noise.

Also, as the ridge 5 (Ra) is formed protruding into the tire inner cavity side in a direction opposite to the radial direction so as to encompass the entirety of the width of the circumferential main groove that is positioned farthest to the shoulder side, the rigidity of the shoulder region of the tread portion is increased, thus increasing the specific frequency of the specific mode in which the shoulder is deformed and reducing road noise in the middle frequency range.

A thickness (height) D of the ridge 5 (Ra) from the innermost layer of the carcass layer is from 1.0 to 10 mm greater than in other regions of the tire cavity side surface. The difference in thickness is preferably from 1.2 to 8.0 mm and more preferably from 1.5 to 6.0 mm. When the difference in the thickness of the ridge 5 (Ra) is less than 1.0 mm, the effect of reducing cavity resonance and reducing road noise cannot be achieved. Also, when larger than 10 mm, the increase in the weight of the tire leads to an increase in rolling resistance.

As described above, the width Za in the tire width direction of the ridge 5 (Ra), protruding into the tire inner cavity side in the direction opposite to the tire radial direction, of the pneumatic tire of the present invention, is large enough to encompass the entire width Zw of the well 2w, and must also be large enough to encompass the entire width W of the circumferential main groove 4S most to the shoulder side. However, the boundary in the tire width direction of a shoulder side edge R1 of the width Za of the ridge 5 (Ra) is preferably positioned closer to the tire center than an intersection point P of a perpendicular line drawn from an edge 8E of the widest part of the belt layer 8 to the carcass layer 7. FIG. 1B illustrates this positional relationship. When the shoulder side edge R1 of the width Za of the ridge 5 (Ra) extends farther to the outside than the intersection point C, the tire rigidity in the side section 10 increases, leading to reduced riding comfort as well increased tire rolling resistance.

Figure 2:
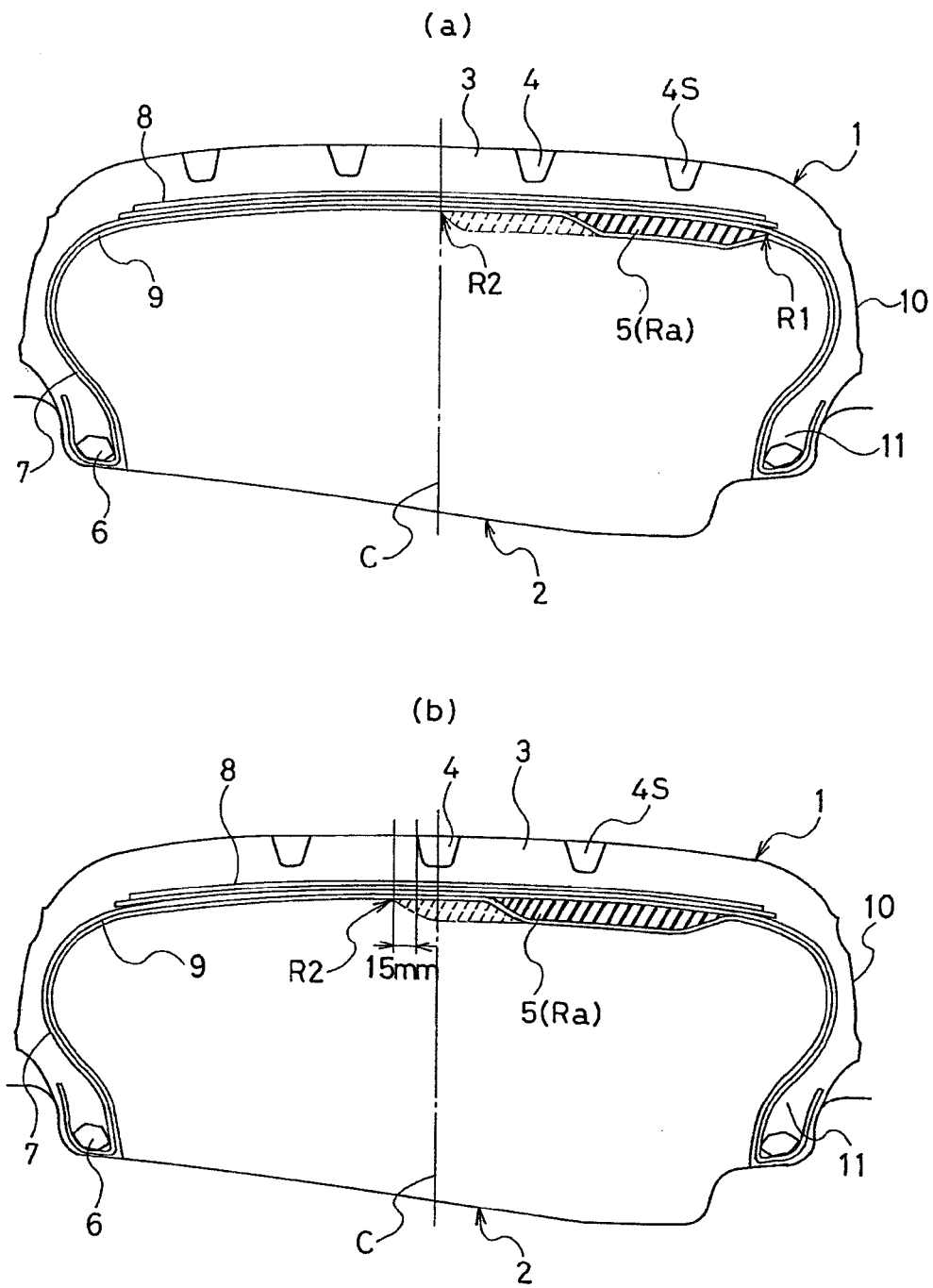
FIGS. 2A and 2B are meridian cross-sectional views for explaining an expanded region of a circumferential ridge 5 (Ra) in the tire width direction of a pneumatic tire.

Also, in a pneumatic tire with no circumferential main groove 4 on the tire center, the shoulder side edge R2 of the width Za of the first ridge 5 (Ra) preferably extends to the tire center C as shown in FIG. 2A. When the edge R2 surpasses the tire center and extends to the opposite side, the cavity resonance effect is almost entirely saturated leading to an increase in disadvantages such as increased rolling resistance due increased weight, increased costs, and the like.

Also, in a pneumatic tire provided with the circumferential main groove 4 on the tire center C, as shown in FIG. 2B, the edge R2 of the ridge 5 (Ra) nearer the tire center is preferably within a region extending from the edge of the circumferential main groove 4 on the tire center C on the side opposite to the well 2w up to 15 mm to that same opposite side. This is because an effect of reduced medium frequency road noise can be achieved if the width Za of the ridge 5 (Ra) extends as far as an area below the tire center main groove. If extended farther than this to the side opposite the well 2w, the effect in reduction of cavity resonance is saturated and increase in rolling resistance with weight increase and cost increase will occur.

Figure 3:
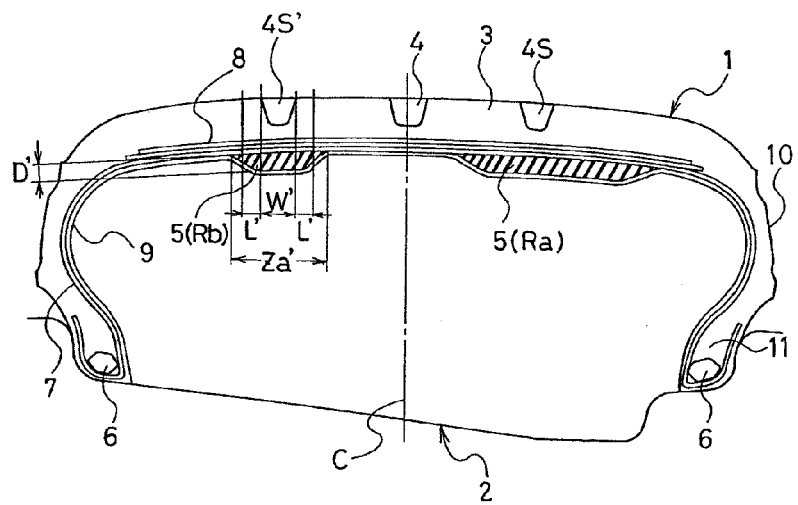
FIG. 3 is a meridian cross-sectional view of a wheel assembly for a pneumatic tire of another embodiment of the present invention.

As a ridge provided in the pneumatic tire of the present invention, besides the ridge 5 (Ra) provided on the well side, as shown in FIG. 3, another ridge 5 (Rb) may be formed protruding into the tire inner cavity side in a direction opposite to the radial direction on a side of the tire center opposite to the well extending in the tire circumferential direction that encompasses an entire width of a circumferential main groove 4S' positioned farthest to a shoulder side on the side of the tire center opposite to the well to further improve the reduction in medium frequency range road noise.

The height of the ridge 5 (Rb) is the same as that of the ridge 5 (Ra) above. Also, the width Za' in the tire width direction must be large enough to encompass at least an entire width of the circumferential main groove 4S' positioned farthest to the shoulder side, and preferably extends a distance L' to points 10 mm away from both edges of the circumferential main groove 4S' positioned farthest to the shoulder side. This will lead to further improvement in the reduction of medium frequency range road noise.

When the ridge 5 (Ra) and the ridge 5 (Rb) are positioned so that the tire center C is interposed therebetween, there is a tremendous reduction in medium frequency road noise compared to when there is only the ridge 5 Ra positioned on the well side, despite an increase in mass.

In the present invention, the ridges 5 (Ra, Rb) are preferably formed by interposing an elastomer between the innermost layer of the carcass layer 7 and the inner liner layer 9.

An elastomer having a tan $\delta$ of 0.15 or less is preferably used as the elastomer. When the tan $\delta$ is more than 0.15, rolling resistance increases. The hardness of the elastomer is preferably from 70 to 95 and more preferably from 72 to 85. In this embodiment, the hardness is a value measured in accordance with Japanese Industrial Standard (JIS) K6253 and tan $\delta$ is a value measured under the conditions of a frequency of 20 Hz, an initial distortion of 10%, an amplitude of ±2%, and a temperature of 60° C. using a viscoelastic spectrometer.

The elastomer is preferably provided on the inner side of the innermost layer of the carcass layer 7 as this can be accomplished without increasing the length of the carcass layer and the belt layer in the tire width direction, leading to advantages such as easy, low-cost production. Also, the elastomer is preferably formed on an outside of the inner liner layer 9 so that a surface (surface exposed on the inner cavity side) of the ridge 5 can obtain an effect of reduced generation of resonance noise. It is preferable that the inner liner layer 9 act as an acoustic boundary.

The ridges 5 may also be formed by other methods, such as by increasing the thickness of the inner liner layer 9 at a relevant location. Alternatively, a sheet forming the ridge may be interposed between the carcass layer 7 and the inner liner layer 9. Also, the ridges 5 may be formed by adhering separately-produced ridges to the inside surface of the tire after production of the tire. Furthermore, the ridges 5 may be formed by using a rigid core or a bladder having a groove at a position corresponding to a position where the ridges are to be formed.

Although there are no particular limits on the material used to form the ridges 5, a rubber, a resin, or the like can be preferably used. Also, foam materials and hollow-structured materials may be used.

The cross-sectional shape of the ridges 5 in the tire meridian direction may be a substantially trapezoidal shape as shown in the drawings, or any of an isosceles triangular shape of moderate height, a right angle triangular shape of similarly moderate height, a substantially rectangular shape, a crescent shape, or the like. However, considering production stability and long-term performance sustainability, trapezoidal shapes, isosceles triangular shapes of moderate height, arc shapes, or substantially rectangular shapes are preferable.

The tire of the present invention provided with the ridges 5 (Ra, Rb) on the tire cavity side surface as described above is preferably formed so that tire masses on both sides are equal when the tire is bisected at the tire center C. When thus formed, a tire profile (rising) when rotating at high speed becomes substantially symmetrical in the width direction, enabling a reduction an amount of change in the properties of the tire between when the tire is rotating at a low speed and when the tire is rotating at a high speed.

Possible methods for equalizing the tire masses on both sides of the tire center C include adjusting the mass of the tire by variously adjusting the size, material, shape, etc. of the ridge. Accordingly, considering that in the present invention the masses on both sides of the tire center C should be as equal as possible, a ridge 5 may be provided on one side or both sides of the tire center C. Note that for the purposes of the present invention, "equal masses on both sides of the tire center C" is means that a difference between the tire masses on both sides of the tire center C is no more than 3%.

EXAMPLES

I. Tires without Main Groove on Center

Examples 1 to 2 and Comparative Examples 1 to 4

A total of six types of pneumatic tires including two types (Examples 1 and 2) of pneumatic tires of the present invention and four types (Comparative Examples 1 to 4) of pneumatic tires other than the present invention were prepared. The tires had a size of 215/55R17 and each had four circumferential main grooves, none of which was on the center. The presence or absence of ridges varied for each type; when ridges were present, the position and size thereof varied. The tires were mounted onto a rim of a 17×7J wheel and inflated to a standard internal pressure according to The Japan Automobile Tyre Manufacturers Association (JATMA).

In each of the examples and comparative examples, the ridges were formed from an elastomer (JIS hardness: 74, tan δ: 0.13, specific gravity: 1.10). In each of the examples and comparative examples, the ridge was arranged in the positions shown in FIGS. 4A to 4F. All ridges were provided on an inner side of a carcass layer and on an outer side of an inner liner layer. The details are shown in Table 1.

The presence or absence of cavity resonance reduction and road noise reduction as well as the degree thereof were measured and evaluated. Measurements were taken according to the methods described below.

Figure 6:
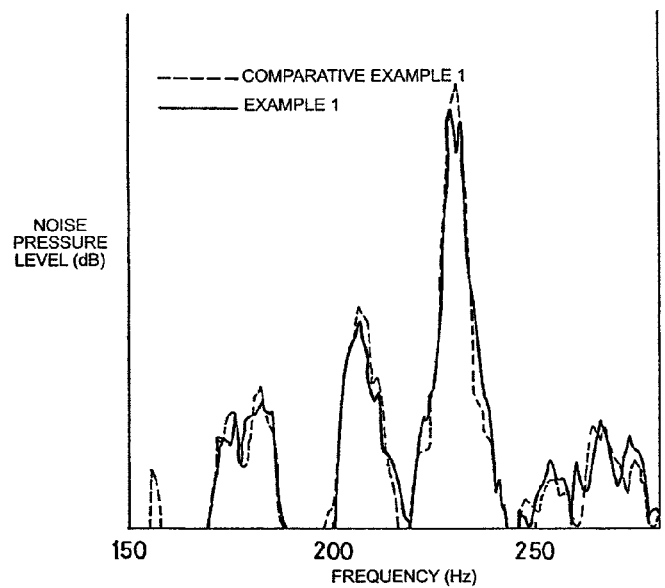
FIG. 6 depicts traces of curves for the peak levels of cavity resonance (dB) in narrow band waveforms near 200 to 250 Hz obtained in Example 1 (solid line A) and Comparative Example 1 (dotted line B)

FIG. 6 shows traces of the curves for peak levels of cavity resonance (dB) in narrow band waveforms near 200 to 250 Hz obtained in Example 1 (solid line A) and Comparative Example 1 (dotted line B).

As is evident from FIG. 6, the peak levels of cavity resonance (dB) are improved several dB by the present invention. The pneumatic tire of the present invention thus leads to more comfortable and safer driving.

(1) Cavity Resonance

After mounting each of the test tires on a domestic FR vehicle (Front-engine, Rear-wheel drive) having an engine displacement of 2,000 cc, vehicle noise pressure levels while traveling at a speed of 60 km/hr were measured. These were then used to determine the peak levels of cavity resonance (dB) in narrow band waveforms near 200 to 250 Hz.

(2) Road Noise

After mounting each of the test tires on a domestic FR vehicle having an engine displacement of 2,000 cc, vehicle noise pressure levels while traveling at a speed of 60 km/hr were measured. These were then used to determine values (dB) for the 315 Hz band in the ⅓ octave band.

TABLE 1

Figure 4:
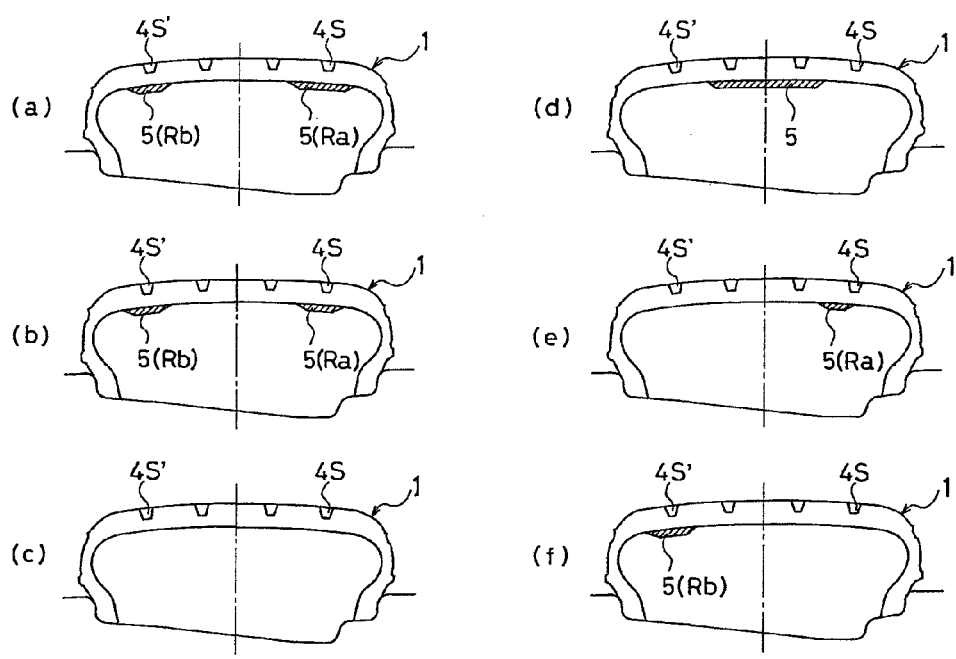
FIGS. 4A to 4F are cross-sectional views in the tire meridian direction schematically showing the positions of the ridges used in Examples 1 and 2 and Comparative Examples 1 to 4.

|  | Example 1 | Example 2 | Comparative example 1 | Comparative example 2 | Comparative example 3 | Comparative example 4 |
|---|---|---|---|---|---|---|
| Ridge position | FIG. 4A | FIG. 4B | FIG. 4C | FIG. 4D | FIG. 4E | FIG. 4F |
| Ridge width Za (mm) | 60 | 35 | — | 70 | 25 | — |
| Ridge width Za' (mm) | 35 | 35 | — | — | — | 35 |
| Ridge height D (mm) | 5 | 5 | — | 5 | 5 | — |
| Ridge height D' (mm) | 5 | 5 | — | — | — | 5 |
| Position of R1 from center (mm) | 80 | 80 | — | — | 55 | — |
| Position of R2 from center (mm) | 20 | 45 | — | — | 30 | — |
| Road noise (315 Hz band) | 61.2 | 61.8 | 63.2 | 63.2 | 63.2 | 63.0 |
| Cavity resonance (dB) | 56.7 | 57.0 | 59.4 | 59.3 | 59.2 | 59.3 |

II. Tires with Main Groove on Center

Examples 3 to 4 and Comparative Examples 5 to 8

A total of six types of pneumatic tires of size 215/55R17 all having three circumferential main grooves, one of which located on the tire center, were prepared. Two types of inflatable tires according to the present invention (examples 3 and 4) and 4 tires of types other than the present invention (comparative examples 5 to 8), a total of six types in all, were prepared. The presence or absence of ridges varied for each type; when ridges were present, the position and size thereof varied. The tires were mounted onto a rim of a 17×7J wheel and inflated to a standard internal pressure according to JATMA.

In each of the examples and comparative examples, the ridges were formed from an elastomer (JIS hardness: 74, tan δ: 0.13, specific gravity: 1.10). In each of the examples and comparative examples, ridges were provided in positions shown in FIGS. 5A to 5F. All ridges were provided on an inner side of a carcass layer and on an outer side of an inner liner layer. The details are shown in Table 2.

The presence or absence of cavity resonance reduction and road noise reduction as well as the degree thereof were measured and evaluated.

TABLE 2

Figure 5:
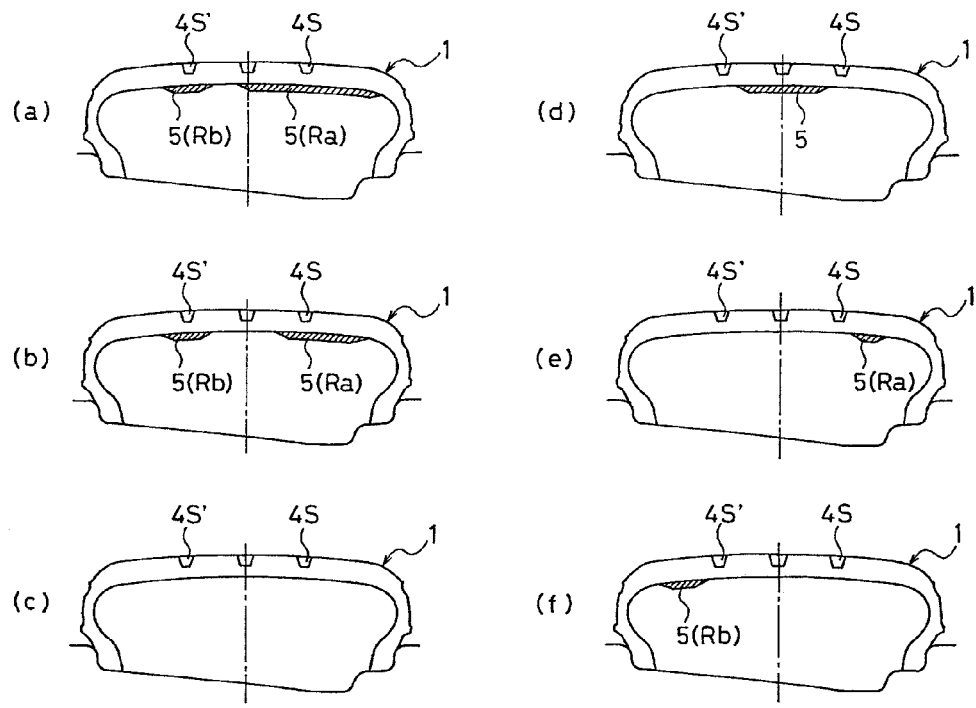
FIGS. 5A to 5F are cross-sectional views in the tire meridian direction schematically showing the positions of the ridges used in Examples 3 and 4 and Comparative Examples 5 to 8.

| | Example 3 | Example 4 | Comparative Example 5 | Comparative Example 6 | Comparative Example 7 | Comparative Example 8 |
|---|---|---|---|---|---|---|
| Ridge position | FIG. 5A | FIG. 5B | FIG. 5C | FIG. 5D | FIG. 5E | FIG. 5F |
| Ridge width Za (mm) | 95 | 65 | — | 65 | 25 | — |
| Ridge width Za' (mm) | 35 | 35 | — | — | — | 35 |
| Ridge height D (mm) | 5 | 5 | — | 5 | 5 | — |
| Ridge height D' (mm) | 5 | 5 | — | — | — | 5 |
| Position of R1 from center (mm) | 85 | 80 | — | — | 85 | — |
| Position of R2 from center (mm) | −10 | 15 | — | — | 60 | — |
| Road noise (315 Hz band) | 60.4 | 60.9 | 62.6 | 62.6 | 62.7 | 62.5 |
| Cavity resonance (dB) | 56.9 | 57.2 | 59.5 | 59.4 | 59.3 | 59.5 |

What is claimed is:

1. A pneumatic tire comprising:
   a tread portion and a belt layer on an outer periphery of a carcass layer that extends between left and right bead portions and
   a plurality of circumferential main grooves extending in a tire circumferential direction provided on an outer surface of the tread portion, wherein
   on a tire cavity side surface of the tread portion, a ridge (Ra) protruding into the tire cavity side in a direction opposite to a tire radial direction is formed that extends in the tire circumferential direction in a position offset from a tire center towards a well side of a mounting rim so as to encompass an entire width of a well and an entire width of a circumferential main groove positioned farthest to a shoulder side; and
   an edge of the ridge (Ra) on the shoulder side in a tire width direction is positioned more towards the tire center than a point where a perpendicular line extending from an edge of a widest part of the belt layer intersects the carcass layer, and an edge of the ridge (Ra) on the tire center side extends to the tire center if there is no circumferential main groove provided on the tire center, and to a point on a side of the circumferential main groove on the tire center opposite to the well that is 15 mm removed from an edge of the circumferential main groove on the side opposite to the well if there is a circumferential main groove provided on the tire center.

2. The pneumatic tire according to claim 1, wherein a thickness of the ridge (Ra) from an innermost layer of the carcass layer is from 1.0 to 10 mm greater than in other regions of the tire cavity side surface.

3. The pneumatic tire according to claim 1, wherein another ridge (Rb) is formed on the side of the tire center opposite to the well extending in the tire circumferential direction and protruding into the tire cavity side in the direction opposite to the tire radial direction so as to encompass an entire width of a circumferential main groove positioned farthest to a shoulder side on the side of the tire center opposite to the well.

4. The pneumatic tire according to claim 3, wherein a thickness of the ridge (Rb) from the innermost layer of the carcass layer is from 1.0 to 10 mm greater than other regions of the tire cavity side surface.

5. The pneumatic tire according to claim 1, wherein tire masses on left and right sides when a tire main body is bisected at the tire center are equal.

6. The pneumatic tire according to claim 1, wherein the ridges are formed by disposing an elastomer between an inner liner layer and the innermost layer of the carcass layer.

7. The pneumatic tire according to claim 6, wherein a tan δ of the elastomer is 0.15 or less.

8. The pneumatic tire according to claim 6, wherein a hardness of the elastomer is from 70 to 95.

9. The pneumatic tire according to claim 1, wherein a thickness of the ridge (Ra) from an innermost layer of the carcass layer is from 1.2 to 8.0 mm greater than in other regions of the tire cavity side surface.

10. The pneumatic tire according to claim 6, wherein a hardness of the elastomer is from 72 to 85.

11. The pneumatic tire according to claim 2, wherein tire masses on left and right sides when a tire main body is bisected at the tire center are equal.

12. The pneumatic tire according to claim 3, wherein tire masses on left and right sides when a tire main body is bisected at the tire center are equal.

13. The pneumatic tire according to claim 2, wherein the ridges are formed by disposing an elastomer between an inner liner layer and the innermost layer of the carcass layer.

14. The pneumatic tire according to claim 3, wherein the ridges are formed by disposing an elastomer between an inner liner layer and the innermost layer of the carcass layer.

15. The pneumatic tire according to claim 5, wherein the ridges are formed by disposing an elastomer between an inner liner layer and the innermost layer of the carcass layer.

16. The pneumatic tire according to claim 7, wherein a hardness of the elastomer is from 70 to 95.

* * * * *